United States Patent
Lesieur et al.

(10) Patent No.: US 11,657,366 B2
(45) Date of Patent: May 23, 2023

(54) SYSTEM AND METHOD FOR AUGMENTED REALITY LOADING

(71) Applicant: Walmart Apollo, LLC, Bentonville, AR (US)

(72) Inventors: Daniel J. Lesieur, Rogers, AR (US); Steven Lewis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 1030 days.

(21) Appl. No.: 16/054,434

(22) Filed: Aug. 3, 2018

(65) Prior Publication Data
US 2019/0043004 A1     Feb. 7, 2019

Related U.S. Application Data

(60) Provisional application No. 62/541,351, filed on Aug. 4, 2017.

(51) Int. Cl.
*G06Q 10/08* (2023.01)
*G06T 19/00* (2011.01)
*G02B 27/01* (2006.01)
*G06T 15/00* (2011.01)
*G06Q 10/087* (2023.01)

(52) U.S. Cl.
CPC ....... *G06Q 10/087* (2013.01); *G02B 27/0176* (2013.01); *G06T 15/005* (2013.01); *G06T 19/006* (2013.01); *G02B 27/017* (2013.01); *G02B 2027/0134* (2013.01); *G02B 2027/0178* (2013.01)

(58) Field of Classification Search
CPC .......... G06Q 10/087; G02B 2027/0178; G02B 2027/013; G02B 27/017; G02B 27/0176; G06T 15/005; G06T 19/006
See application file for complete search history.

(56) References Cited

U.S. PATENT DOCUMENTS 6,563,520 B1    5/2003  Parker et al.
9,595,115 B1    3/2017  Cederlof
(Continued)

OTHER PUBLICATIONS

DHL. (May 4, 2014). Retrieved from <https://www.dhl.com/discover/content/dam/dhl/downloads/interim/full/dhl-csi-augmented-reality-report.pdf> (Year: 2014).*
(Continued)

*Primary Examiner* — Rupangini Singh
*Assistant Examiner* — Manal A Alsamiri
(74) *Attorney, Agent, or Firm* — Morgan, Lewis & Bockius LLP; Manita Rawat (57) ABSTRACT

Systems, methods, and computer-readable storage media for using augmented reality to improve loading, and in particular improve loading when the types and order of items to be loaded is unknown. A server uses information regarding the packages which have already been stored in a storage area to generate a three-dimensional map of where the stored packages currently are placed. Upon receiving information indicating a subsequent package is going to be stored, the server can identify the best place to store that package in the storage area, then communicate that storage location to an augmented reality device worn by a worker. The worker can then have a visual indication showing where and how to place the subsequent package.

6 Claims, 7 Drawing Sheets

(56) References Cited

U.S. PATENT DOCUMENTS

| | | | |
|---|---|---|---|
| 9,632,313 B1 | 4/2017 | Madan et al. | |
| 9,665,960 B1 | 5/2017 | Masters et al. | |
| 2003/0232708 A1 | 12/2003 | Rabiea | |
| 2008/0215179 A1* | 9/2008 | Yair | G06Q 10/087 700/215 |
| 2014/0156459 A1 | 6/2014 | Zises | |
| 2015/0130592 A1* | 5/2015 | Lakshminarayanan | B65G 67/20 340/10.1 |
| 2016/0049006 A1* | 2/2016 | Mullins | G06T 19/006 345/419 |
| 2017/0243157 A1* | 8/2017 | Piron | G16H 40/20 |
| 2018/0018619 A1* | 1/2018 | Kisiler | G06Q 10/083 |
| 2018/0025460 A1* | 1/2018 | Watanabe | G06Q 10/047 705/28 |
| 2018/0068266 A1* | 3/2018 | Kirmani | G01G 19/005 |

OTHER PUBLICATIONS

Glockner, H. et al. "Augmented Reality in Logistics", DHL Customer Solutions and Innovation; 2014 (28 pp).

"Vision Picking at DHL—Augmented Reality in Logistics", DHL; https://www.youtube.com/watch?v=l8vYrAUbOBQ; Jan. 26, 2015 (1 pp).

"Picavi: Vision Picking with Smart Glasses", Picavi GmbH; https://www.youtube.com/watch?v=B6zPnVGS0VI; Mar. 5, 2015 (1 pp).

"Connect Smart Glasses and SAP with the Simplifier", iTiZZiMO; https://www.youtube.com/watch?v=ZWsBHISOqjA; Jun. 5, 2013 (1 pp).

"Augmented Reality Warehouse—Extended Warehouse Management", Quinso; https://www.youtube.com/watch?v=5E6qambiCo0; Jun. 16, 2016 (1 pp).

"IBM and Tesco test Augmented Reality mobile app", IBM UK & Ireland; https://www.youtube.com/watch?v=qJMyC9o08OM; Feb. 26, 2014 (1 pp).

"KNAPP AG—KiSoft Vision", KNAPP AG; https://www.youtube.com/watch?v=BWY8uFlteIM; Dec. 7, 2011 (1 pp).

International Search Report and Written Opinion dated Nov. 15, 2018, issued in corresponding International PCT Application No. PCT/US2018/045238.

\* cited by examiner

SYSTEM AND METHOD FOR AUGMENTED REALITY LOADING

BACKGROUND

1. Technical Field

The present disclosure relates to using augmented reality to show users where to place items, and more specifically to show users where items should go based on currently loaded items.

2. Introduction

Loading items is an art that can take years of practice to perfect. As anyone who has loaded (or watched someone else load) a moving van, a freight truck, or a grocery bag can attest, some individuals are better than others at judging and determining where to place items. Part of the challenge of loading in these situations is that as the loader is placing a first item, they may not know the size, shape, or nature of a second, subsequent, item. If a system or person knew each and every item being loaded beforehand, it is conceivable that an optimized or "best" loading pattern could be achieved. However, in situations where subsequent items are unknown, improvements to the loading process can be made.

The use of augmented reality, where users can view graphics displayed over a view of reality, is increasing. Exemplary uses of augmented reality include games and providing users with information about surroundings. However, augmented reality has not, to date, been used to assist users in loading items, due in part to the technical difficulties associated with this use. Specifically, to be able to assist in the loading process, an augmented reality system must track the current locations of items, generate three-dimensional models of those items, and provide directions to a user based on that data.

SUMMARY

A method for performing concepts disclosed herein can include: identifying, via a processor accessing a database and for each package in a plurality of packages which are stored in a storage area: a package content; a package weight; package dimensions; and a package location; generating, via the processor, a three-dimensional map of the storage area based on the package dimensions and the package location of each package in the plurality of packages; identifying a next package to be stored in the storage area, the next package having a next package content, next package dimensions, and a next package weight; as the next package is being delivered to the storage area, determining, via the processor, a storage location within the storage area for the next package, wherein the storage location is based on: the next package content; the next package dimensions; the next package weight; the package content of each of the plurality of packages; the package weight of each of the plurality of packages; the package dimensions of each of the plurality of packages; the package location of each of the plurality of packages; and package placement rules; transmitting, to an augmented reality device, the storage location and the next package dimensions, such that the augmented reality device generates an augmented reality view of the storage area with a virtual package in the storage location, the virtual package having the next package dimensions.

An augmented reality device configured as disclosed herein can include: at least one transparent display having an inner surface and an outer surface, wherein the inner surface is configured to display graphics to a user; a processor; a computer-readable storage medium having instructions stored which, when executed by the processor, cause the processor to perform operations comprising: receiving, from a server, physical package dimensions associated with a physical package; receiving, from the server, a storage location where the physical package should be placed within a storage area; identifying a current location of the augmented reality device; identifying a current view of the user of the augmented reality device; generating augmented view data based on the current location and the current view, wherein the augmented view data defines dimensions of a virtual package in the storage location, the virtual package illustrating how the physical package should be placed within the storage location based on the physical package dimensions; and displaying, using the augmented view data and on the inner surface of the at least one transparent display, an augmented view of the storage area such that the user, while storing the physical package, can see the storage area with the virtual package displayed graphically in the storage location.

A computer-readable storage medium configured as disclosed herein can have instructions stored which, when executed by a computing device, cause the computing device to perform operations which include: identifying, by accessing a database and for each package in a plurality of packages which are stored in a storage area: a package content; a package weight; package dimensions; and a package location; generating a three-dimensional map of the storage area based on the package dimensions and the package location of each package in the plurality of packages; identifying a next package to be stored in the storage area, the next package having a next package content, next package dimensions, and a next package weight; as the next package is being delivered to the storage area, determining a storage location within the storage area for the next package, wherein the storage location is based on: the next package content; the next package dimensions; the next package weight; the package content of each of the plurality of packages; the package weight of each of the plurality of packages; the package dimensions of each of the plurality of packages; the package location of each of the plurality of packages; and package placement rules; transmitting, to an augmented reality device, the storage location and the next package dimensions, such that the augmented reality device generates an augmented reality view of the storage area with a virtual package in the storage location, the virtual package having the next package dimensions.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Augmented reality is generally defined as a technology which superimposes a computer-generated image on a user's view of the real world, providing a composite view. One famous example is Google Glass™, which are transparent glasses which have a heads-up display, allowing a user wearing the glasses to see graphics/images overlaid on the real world. Another example is Pokemon Go™, a video game which is played on smartphones, where the game uses the smartphone's camera to capture the real world, then overlays fictional characters onto the screen displaying the live real world footage. As smartphones and other AR tools continue to improve, augmented reality may become a common part of everyday life.

Some common, everyday tasks may be improved through the specific implementations of augmented reality disclosed herein. In particular, loading tasks, where a human being places an item in a specific location, can be improved. Examples of loading tasks can include loading a truck (such as a freight truck), loading grocery bags, placing items on a shelf, taking items off of a truck and placing them in specific locations within a warehouse, loading a dishwasher, etc. While the improvements and solutions disclosed herein can be applied to, and improve, all loading tasks, the disclosed concepts are particularly useful where a user is loading items in an unarranged/undetermined order.

For example, when a distribution center is receiving orders from a retail store for additional items, it is more efficient to load freight into a truck as the orders are received other than waiting until a full truck-load of orders has been received. However, because the orders are received in real-time, the packages being loaded into the truck are unarranged, and may not be in the most space efficient order. The worker assigned to load the packages as the retail store orders are received must make judgment calls based on the size of the package, the weight/type of the package, the locations of previously stored packages in the truck, the types/weights of those previously stored packages, etc. To train a worker to do this efficiently and effectively place packages in such circumstances is costly to the retail company. Moreover, no matter how highly trained, workers make mistakes regarding the best location for a given item.

By contrast, users of an augmented reality device and system as disclosed herein, are shown a virtual image of the package they are to load in the place determined to be the best location for the package. Consider the following example of a user of an augmented reality device loading a truck with packages. A server (or other computing device) can receive an image, GPS data, other information identifying what packages are already loaded in the truck, or identifying information based on packages moving within the truck. This other information can include the contents, weights, sizes, etc., of the packages already stored in the truck. Using information about stored packages, the server can generate a three-dimensional map of the truck's storage area, including where the items are stored within the storage area.

When a subsequent item is sent to the storage area, the server can receive information about the subsequent item (content, weight, dimensions, etc.) and, using the three-dimensional map, a specific set of rules on how to store items with respect to other items, capabilities of the worker, etc., determine the best available location for the subsequent item in the storage area. The server can then send this best available location, together with any relevant information about the package (weight, dimensions, special instructions), to an augmented reality device being used by a worker loading the truck.

As the worker is moving the package to the truck, the augmented reality device receives the best available location and any relevant information, then generates an augmented reality view, or an augmented reality experience. This augmented reality view can include graphically presenting, to a display seen by the worker, a virtual package at the best available location, while the worker continues to see a remainder of the storage area in a normal/un-augmented fashion. In one example, the virtual package presented to the worker can be translucent/semi-transparent, such that the worker can see through the virtual package, yet still see how the package should be placed based on the orientation of the virtual package. In another example, the virtual package can have a specific color or color pattern, pulsing pattern, etc., such that the worker can clear identify the location of the virtual package. In another example, a hologram can be projected into the loading area, with the hologram being a virtual package indicating where the physical package should be placed.

The worker then carries/moves the physical package to the storage area to place the physical package "into" the virtual package. When the physical package is located "within" the virtual package, the augmented reality device can send a confirmation to the server that the package has been correctly placed. The server can then update the three-dimensional map based on the confirmation, and use the updated three-dimensional map in identifying the best locations for subsequent packages. This three-dimensional map can also be used by workers to retrieve specific packages, because the map will identify the precise location of each package within the storage area.

In another similar example, a grocery store worker can be shown, via an augmented reality device, the best location for items within grocery store bags based on the previous items already in the bags. In yet another example, a worker unloading a freight truck can be shown where, in a storage facility to place the unloaded freight.

In some configurations, the augmented reality application on the augmented reality device can allow the worker to view the inside of a trailer or other storage area via a three-dimensional model, such as a wireframe model. In addition, in some configurations, the worker can have the ability to place the package in a place of their choosing (i.e., not the location recommended by the server). In such configurations, both the augmented reality device and the server can be updated based on the worker's decision.

The augmented view presented to the user can include additional information beyond only the virtual package. For example, the augmented view can include the name of the storage area (i.e., a trailer number, a room number, a stack number, etc.), how full the storage area is (i.e., a percentage full number), a number of packages currently in the storage area, a destination name, a current location name, etc.

The server can further operate to store information about multiple storage areas, of different sizes, measurements, temperature capacities, etc., and provide storage area specific determinations based on that information to the augmented reality device. For example, if a storage area is taking the form of a temperature controlled trailer traveling to a known location (i.e., Arizona in summer), certain packages may, preferentially, assigned to specific areas within the trailer.

In some configurations, multiple workers may be loading a single storage area at a single time. By using the disclosed system each worker can see where they are to place the particular package they are loading. In some configurations, one worker can see the virtual package where they should place their package, and can simultaneously be presented with another virtual package indicating where another worker will place a different package. The augmented reality device can differentiate these distinct virtual packages within the augmented field of view through shading, color, intensity, labels, etc.

In some cases, the worker may have access to more than a single package to store. For example, if loading a trailer, the worker may have multiple packages available and ready to place on the trailer. If loading grocery bags, the worker may be aware of the next several items on the conveyor belt. In such cases, the augmented view of the worker can provide a list to the worker of the items in line to be loaded into the storage area. In some cases, the server can be configured to identify which of these waiting packages should be loaded first, and provide an indication of that priority to the worker, followed by the virtual package once the worker has begun carrying or moving the package to the storage area.

Users of the augmented reality devices described herein will likewise be able to search a storage area by package description, item number, UPC (Universal Product Code), and/or other qualities of the package. For example, if a worker needs to find an already stored package within a storage area, the augmented reality device can display labels for the stored packages within the heads-up display being presented to the worker. If the worker is looking for a particular package, in addition to augmented reality labels, the desired package may be highlighted within the view presented via the augmented reality device, thereby identifying for the worker which of the stored packages is the sought-for package. Likewise, if useful/desired, the augmented reality device can present a wireframe/outline/three-dimensional model to the worker of the packages. Similarly, as workers are tasked with unloading a storage area, labels, highlighted packages, etc., can be used to direct the workers to move specific packages in a specific order.

Moreover, the augmented reality device can be used to warn the worker if a package meets certain criteria, such as weight exceeding a threshold, chemical or hazmat items, possible reaction with other items stored in the storage area (i.e., bleach and ammonia), etc. For example, if the package to be loaded requires a second worker to carry the package, a graphical warning can be displayed on the augmented reality device, informing the worker that a second worker is needed. Likewise, if the package requires a pallet-loader, forklift, or other special tool to move the package and/or place the package in the identified storage location, a graphic can be displayed to the user informing them of the need for that tool.

In some configurations, the augmented reality device can have a depth sensor associated with the glasses or visor, the depth sensor being configured to verify the dimensions of a package and to validate the proper placement of the item within the trailer or storage space. Similarly, the augmented reality device can use wall textures to assist in accurately determining the depth and remaining loading space within a storage area. For example, the augmented reality device can use depth sensing technology to scan walls or floors at a first time, then compare those first scan with subsequent/second scans at a later time to determine how full a storage space is, or if a package is properly placed. This depth scanning can likewise be used to determine if the trailer/storage space has deformities which may affect loading. For example, the depth sensing can, via a comparison between portions of the storage area, determine if there is damage or warping to particular sections of the storage area, which can result in flagging that portion as damage/warped. This information can then be used in the loading pattern generated and be taken into account as the worker is placing packages.

The disclosed system can likewise be used by supervisors to view the status of the workers, how effective the workers are loading the packages into the storage areas, etc. For example, the augmented reality device, coupled with the backend processing, can be used to allow for improved real-time supervision of the worker as they load/unload packages. Moreover, as the worker loads the packages, the system can generate a report regarding the efficiency of the worker, and can make predictions regarding worker utilization/efficiency, trailer (or other storage area) utilization, live-reporting of how efficiently packages are being loaded into a particular storage area, and/or a final storage area evaluation. This supervisor implementation can generate a map for the supervisor to review, the map illustrating where the packages have been loaded within the storage area. Likewise, the map can highlight packages based on whether they were placed as indicated by the server/augmented reality device versus placed at the discretion of the worker. The supervisor implementation can likewise allow the supervisor to search for packages based on the item tracking number, carton number, UPC, description, or other package information. The supervisor can likewise use these tools to create specific goals or challenges for each day. These goals and/or challenges can be displayed to the worker via the augmented reality device, allowing the worker (the end user) to see the progress of the individual worker and/or the group as they work towards completing various goals. Additional reporting, dashboards, efficiencies, etc., can be generated as required by supervisors or management.

The disclosed system can also be used to train workers on how to efficiently load packages into trailers and other storage areas. For example, using the augmented reality system described, the worker can realistically load a trailer based on a set of criteria such as trailer length, trailer type, case selection, etc. The training can provide a simulation summary which shows the worker how their choices and decisions affected the overall loading efficiency, and can correct any improper loading techniques, unsafe lifting, etc.

Having described some examples of implementations of the invention, the disclosure now turns to the exemplary embodiments and examples of the figures. While specific implementations are described, it should be understood that this is done for illustration purposes only. Other components and configurations may be used without parting from the spirit and scope of the disclosure. The disclosure now turns to FIG. 1.

Figure 1:
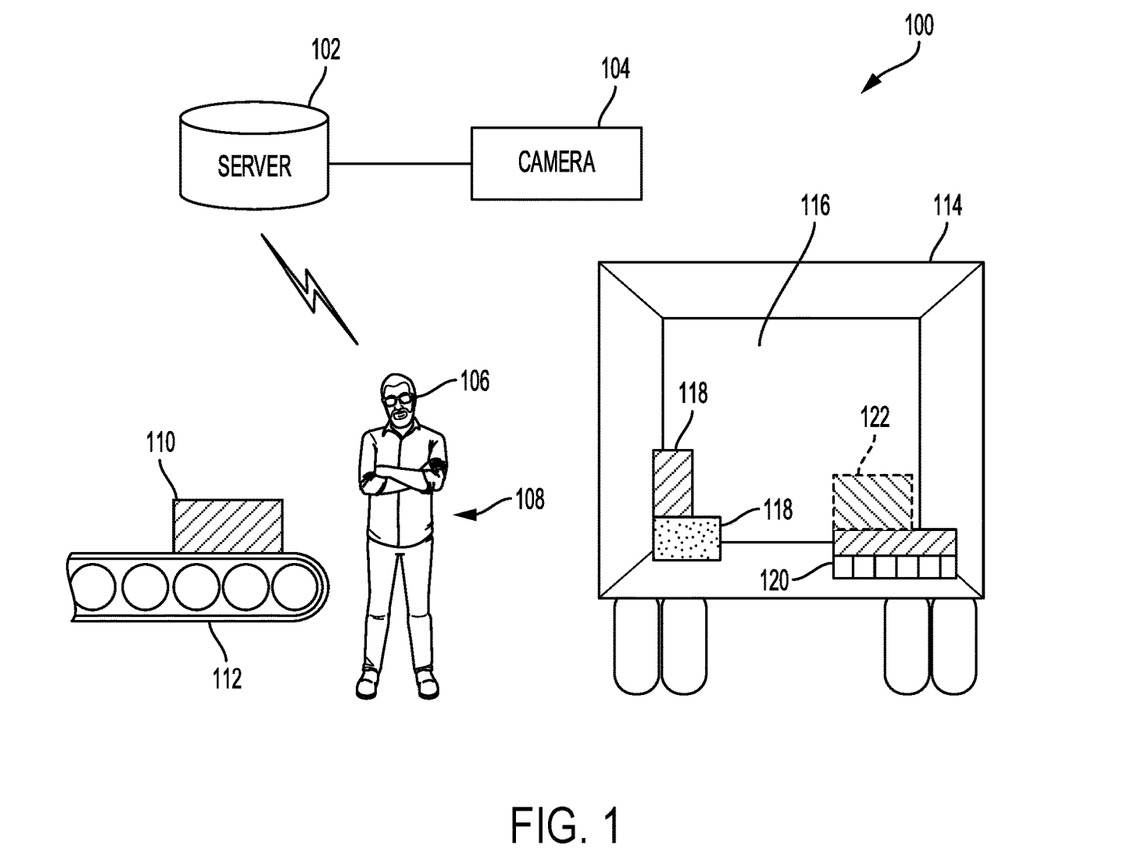
FIG. 1 illustrates an example of a user using augmented reality to load a truck.

FIG. 1 illustrates an example 100 of a user 108 using augmented reality to load a truck 114. In this example 100, the user 108 is wearing augmented reality glasses 106 to assist in loading a truck 114 with packages received via a conveyor belt 112. As packages 118 and/or pallets 120 are loaded into the truck 114, a camera 104 records where the items 118, 120 are stored in the truck 114. In some configurations, this camera 104 is part of the augmented reality glasses 106 worn by the user 108, whereas in other configurations the camera 104 is a separate camera. In yet other configurations, no camera 104 is used, and the server 102 receives information about the packages through GPS, RFID, or other mechanisms. A server 102 connected to the camera 104 constructs a three-dimensional map of the interior 116 the truck 114 based on that location information.

When a new package 110 is ready to be loaded into the truck 114, the package 110 is sent to the user 108 using the conveyor belt 112. As the package 110 is en route to the user 108 via the conveyor belt 112, the package 110 is scanned and identified. This identification is communicated to the server 102, which uses the three-dimensional map of the current truck 114 condition to identify where the new package 110 should be stored. This planned storage location is transmitted from the server 102 to the augmented reality device (glasses) 106 of the user 108. The augmented reality device 106 then uses the storage location received from the server to generate a virtual package 122 which is only visible to the user 108. As the user 108 carries the actual, physical package 110 to the virtual package, the augmented reality device makes real-time adjustments to the graphics being produced such that the virtual package 122 presented to the user 108 shifts perspectives based on the user's position. Once the user 108 has placed the package 110 "onto" the virtual package 122, the camera 104 registers the package 110 as properly placed within the interior 116 of the truck 114, and can update the three-dimensional map based on that placement. When another, subsequent package is delivered to the user 108, the updated three-dimensional map can be used for identifying where that subsequent package should be placed.

Figure 2:
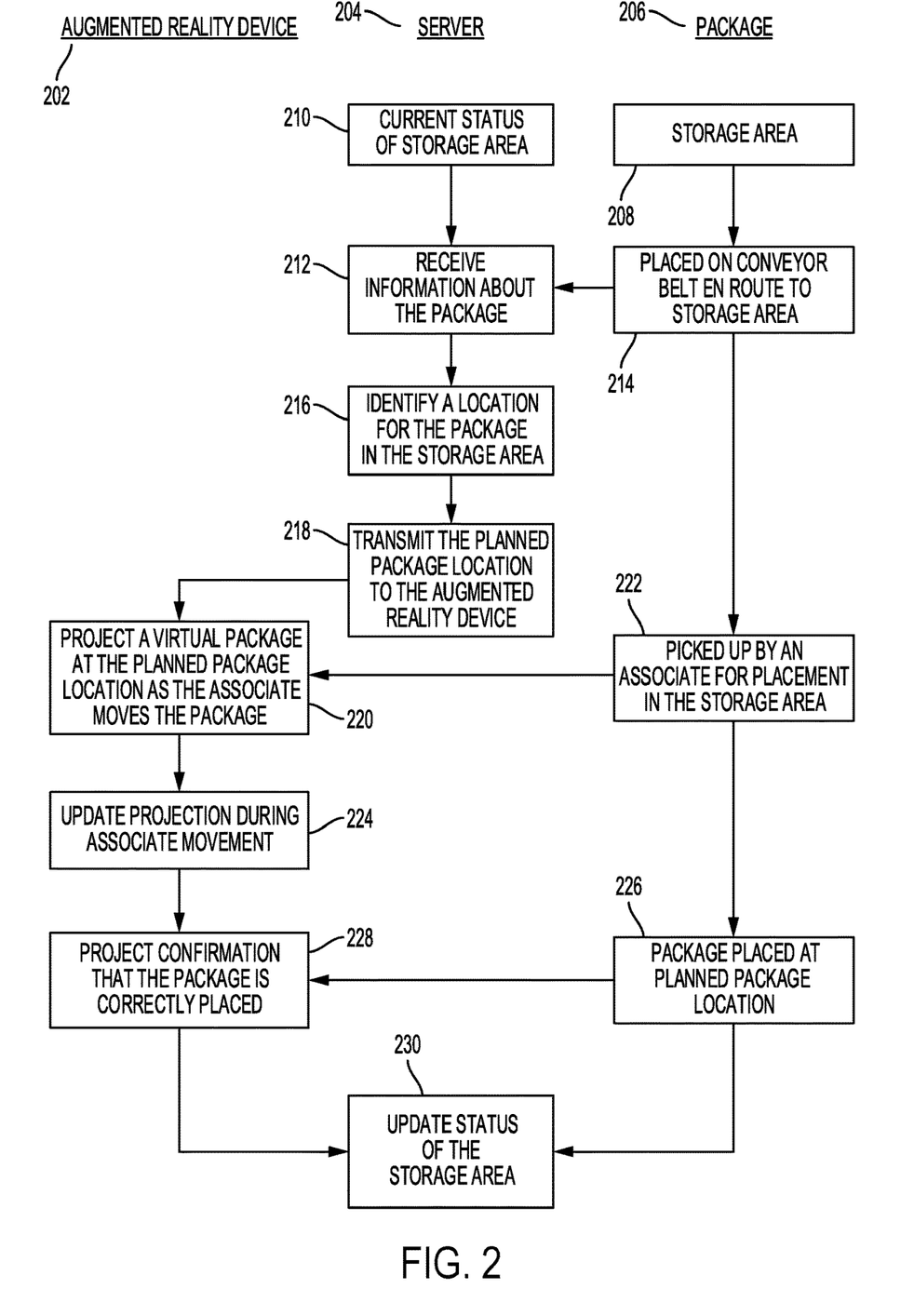
FIG. 2 illustrates an example system architecture for augmented reality loading.

FIG. 2 illustrates an example system architecture for augmented reality loading. In this example, three columns 202, 204, and 206 respectively identify what actions are occurring at the augmented reality device 202, the server 204 or backend computing systems, and to the physical package 206 being stored. In this example, the server 204 first identifies a current status of a storage area 210. This can entail identifying what packages are already in the storage area with their respective contents, dimensions, restrictions, etc. The server 204 can, at this point, generate a three-dimensional map or other guide which can be used when identifying where to place future packages. When a new package 206 is flagged to be placed in the storage area 208, the new package is placed on a conveyor belt 214. The server 204 receives information (dimensions, content, etc.) about the package 206, 212 and identifies a location for the package in the storage area 216. The server then transmits the planned package location 218 to the augmented reality device 202.

An associate picks up the package for placement within the storage area 222, and the augmented reality device 202 being worn by the associate projects a virtual package to the associate. The virtual package being projected is at the planned package location, and as the associate moves the package 220 to the planned package location, the augmented reality device 202 makes real-time updates/adjustments to the virtual package being projected 224, such that the shape and perspective of the virtual package projected are updated based on the location of the associate. As the associate places the package at the planned package location 226, the augmented reality device 202 can project a confirmation that the package is correctly placed 228. This status is then communicated to the server 204, which can update the overall status (i.e., the three-dimensional map) of the storage area 230.

Figure 3:
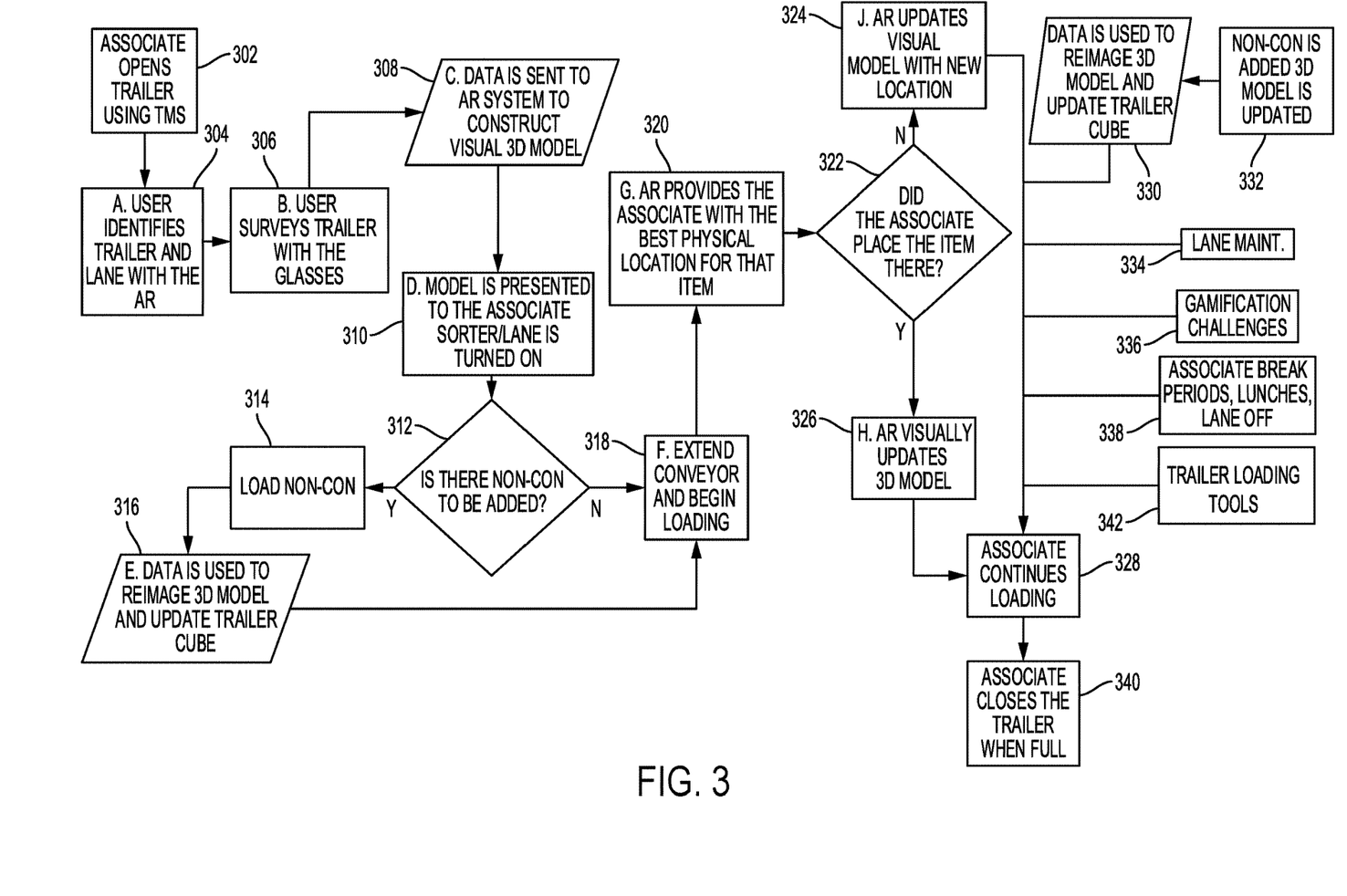
FIG. 3 illustrates an example process flowchart for augmented reality loading.

FIG. 3 illustrates an example process flowchart for augmented reality loading. In this example, an associate/user is to load a trailer using augmented reality to assist in directing the associate where to place packages. In other examples, the storage area where the products are placed could be something other than a trailer. The associate first opens the trailer or storage area virtually via an application, trailer management system (TMS) 302 or other management system, thereby indicating that the associate is ready and able to begin loading the trailer. The user, via augmented reality, identifies the trailer and lane where the packages will be received 304. The user surveys the trailer with the glasses 306, visor, camera, or other augmented reality tool, and that data is send to an augmented reality system to construct a visual 3D model 308. The model is presented to the associate, and the sorter/lane is turned on 310. The sorter is used, for example, to divert products and packages to the lane from a conveyor belt which feeds multiple lanes.

At this point, the system can identify if there are packages which are not from a conveyor belt which need to be loaded 312. If so, the user can load the non-conveyor belt material 314, and the data associated with that non-conveyor belt material is used to reimage a 3D model and update the trailer cube 316. After any non-conveyor belt material is loaded into the trailer, the conveyor belt can be extended and the user can begin loading 318. Augmented reality provides the associate with the best physical location for each item 320. After the associate places each item, the system determines if the associate placed the item in the correct location 322. If so, the augmented reality system can update the 3D model 326, and the associate continues loading 328 the trailer. If not, the augmented reality updates the visual model with new location information 324.

Data associated with the new location information, as well as non-conveyor belt material modeling information 332, is used to reimage the 3D model and update the trailer cube 330. The associate continues loading 328, and can be updated via the augmented reality device of lane maintenance issues 334, gamification challenges 336, information such as break periods, lunches, or when the lane is being shut off 338, or trailer loading tools 342. The trailer loading tools 342, for example, can allow the worker, or the system, to add loading tools to the augmented reality map of the trailer to maintain load stability and/or product safety. Examples of those tools can include airbags, load locks, and temperature control pads. As these tools are added in real-life, they can be simultaneously added to the three-dimensional map of the trailer. Likewise, if the server identifies that a loading tool is needed, it can project one as a virtual image as part of the notification to the worker that the loading tool should be implemented. This process of loading the trailer with packages continues until the trailer is full 340 or until a designated time is met when the trailer will be sent even if not at capacity.

Figure 4:
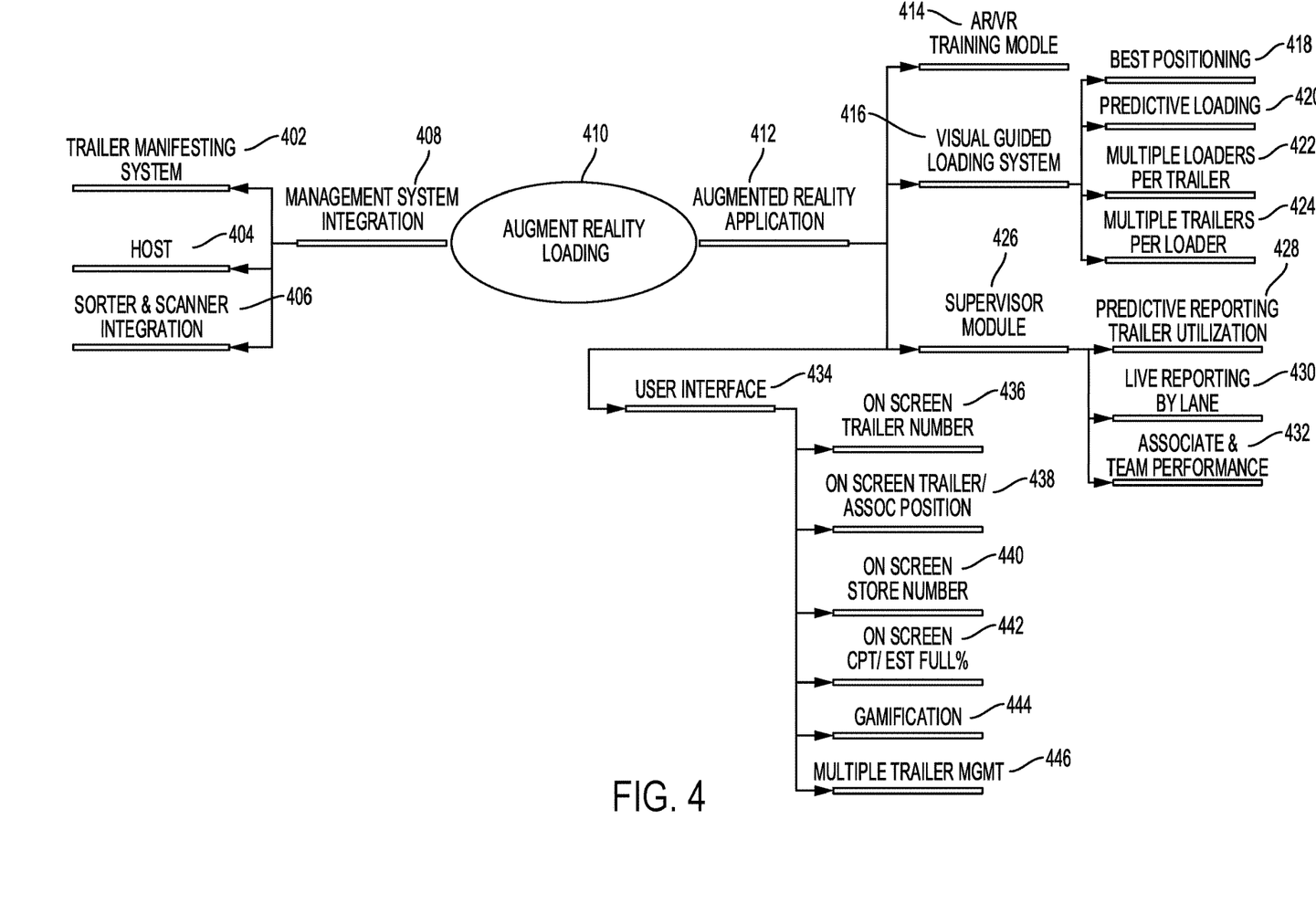
FIG. 4 illustrates exemplary uses of augmented reality trailer loading.

FIG. 4 illustrates exemplary uses of augmented reality loading. The augmented reality loading 410 can be used for management system integration 408. For example, the system can be used to coordinate with a Trailer Manifesting System 402, HOST 404 (Home Office Mainframe System, an external data/computing environment holding relevant item information), and sorter/scanner integration 406. These backend, or server side improvements, improve how the computers themselves operate by increasing the amount and accuracy of the data being used. For example, rather than only having information regarding a package being stored on a trailer, the system is now improved to be able to identify the exact location of where in the trailer the package is stored. This is accomplished through the use of combining layout/orientation/modeling information with real-time camera and/or tracking data, resulting in a computer system with improved capacity and performance with regards to inventory management.

The augmented reality loading 410 can likewise be used for augmented reality applications 412, the clearest of which is a user interface 434. This user interface 434 can be, for example, a heads-up user interface which appears on a display surface visible to the user. Examples of this display surface can include glasses, a visor, contact lenses, etc. An on screen trailer number 436 may be displayed on the heads-up user interface, along with other identifying information about the storage area being filled by the user such as an onscreen trailer/associate position 438 indicating where the associate is currently located (this is particularly useful where the associate is assigned to load multiple trailers/storage areas at once), an on screen store number 440, an on screen completion/estimate for how full the storage area is 442, gamification 444 information, and other multiple trailer management 446 information. These user interface 434 aspects are closely linked with the visual guided loading system 416, which guide associates on where and how to place packages within a storage area. Additional aspects of the visual guided loading system 416 can include providing information to the user regarding best positioning 418 of a package, predictive loading 420, being able to manage such predictions for multiple loaders per trailer 422, and/or multiple trailers per loader 424.

Another aspect of the augmented reality application 412 is the supervisor module 426, which allows for predictive reporting regarding trailer utilization 428, live reporting by lane 430, and individual associate and/or team performances 432. This aspect can be closely tied to the augmented reality/virtual reality training module 414, where the associates are trained in how to properly load specific storage areas, types of packages, operate with the augmented reality systems, etc.

Figure 5:
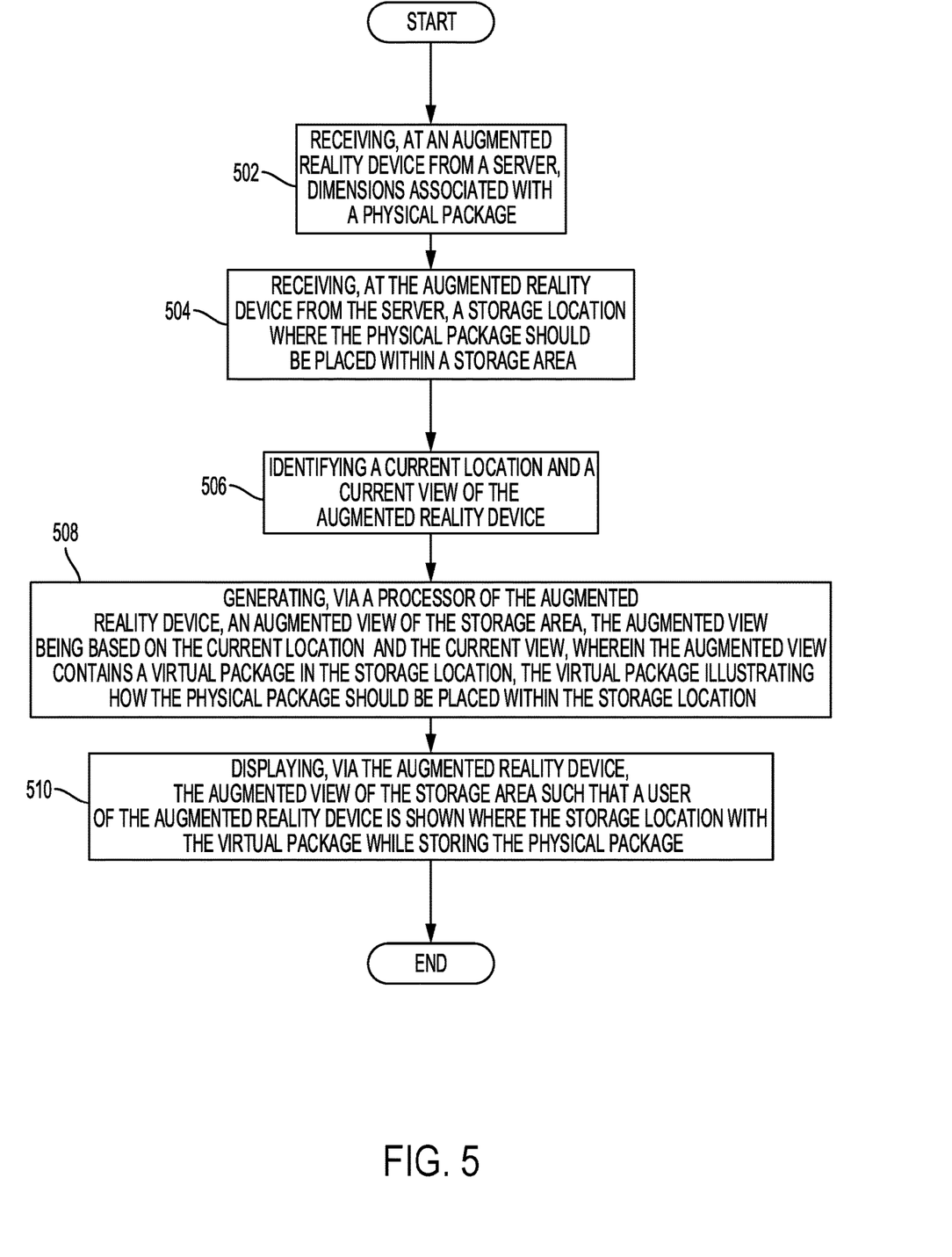
FIG. 5 illustrates a first exemplary method embodiment.

FIG. 5 illustrates a first exemplary method embodiment. In this example, the system practicing the method is an augmented reality device such as an augmented reality visor, glasses, contact lenses, smart phone, etc. The system receives, at the augmented reality device from a server, dimensions associated with a physical package (502). The system further receives, at the augmented reality device from the server, a storage location where the physical package should be placed within a storage area (504). The system identifies a current location and a current view of the augmented reality device (506) (i.e., the system determines where the user currently is and what the user is currently looking at) and generates, via a processor of the augmented reality device, an augmented view of the storage area, the augmented view being based on the current location and the current view, wherein the augmented view contains a virtual package in the storage location, the virtual package illustrating how the physical package should be placed within the storage location (508). The system then displays, via the augmented reality device, the augmented view of the storage area such that a user of the augmented reality device is shown where the storage location with the virtual package while storing the physical package.

Figure 6:
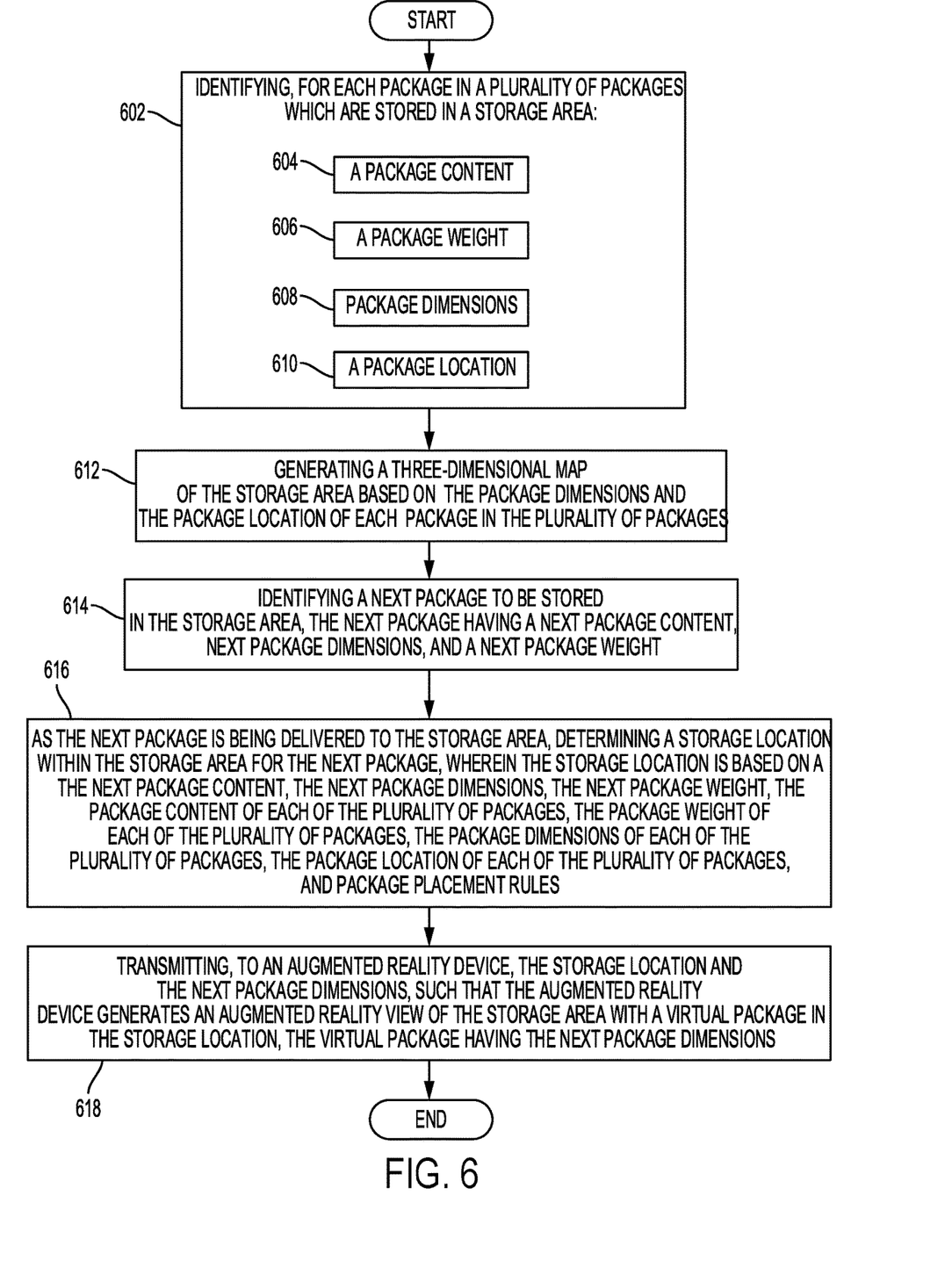
FIG. 6 illustrates a second exemplary method embodiment.

FIG. 6 illustrates a second exemplary method embodiment. An exemplary system performing the concepts illustrated in FIG. 6 could be a server or other backend computing system providing information to an augmented reality device. This system can perform steps such as identifying, for each package in a plurality of packages which are stored in a storage area (602): a package content (604), a package weight (606), package dimensions (608), and a package location (610). The system can generate a three-dimensional map of the storage area based on the package dimensions and the package location of each package in the plurality of packages (612), and can further identify a next package to be stored in the storage area, the next package having a next package content, next package dimensions, and a next package weight (614). As the next package is being delivered to the storage area, the system can determine a storage location within the storage area for the next package, wherein the storage location is based on a the next package content, the next package dimensions, the next package weight, the package content of each of the plurality of packages, the package weight of each of the plurality of packages, the package dimensions of each of the plurality of packages, the package location of each of the plurality of packages, and package placement rules (616). The system can then transmit, to an augmented reality device, the storage location and the next package dimensions, such that the augmented reality device generates an augmented reality view of the storage area with a virtual package in the storage location, the virtual package having the next package dimensions (618).

With respect to the exemplary methods illustrated in FIG. 5 and FIG. 6, the storage area described can be, for example a freight truck, a cargo ship, a shopping cart, a grocery bag, a warehouse, or any other location where items are being stored. The augmented reality device displaying the virtual package can be worn by a human being/user, and can be in the form of glasses, a visor, contact lenses, a smartphone, or any other physical piece of technology which allows a user to view both "real-life" through a display or transparent lens as well as virtual information/graphics overlaid on real-life. Stated differently, the augmented reality device allows a user's optical nerve to register light either reflected from physical objects near the user (as in the case of transparent displays) or generated to represent physical objects near the user (as in the case of non-transparent displays), and which adds light in the form of graphics as a replacement or supplement to the reflected/generated light, the added light representing artificial objects.

In some configurations, the systems used to perform the methods of FIG. 5 and FIG. 6 can be configured such that the next package was unknown when at least one package in the plurality of packages was placed in the storage area. For example, in many cases the next package to be loaded into a truck at a distribution center will not be known until a request for the item is received. In addition, in some configurations the human user wearing the augmented reality device, and which is assigned to load items into the storage area, is assigned to load a plurality of storage areas.

For both FIG. 5 and FIG. 6, the methods illustrated can be augmented to include updating the three-dimensional map based on confirmations sent from the augmented reality device to the server or other backend computing systems. These updated three-dimensional maps can then be used to identify the locations where subsequent packages should be stored.

Figure 7:
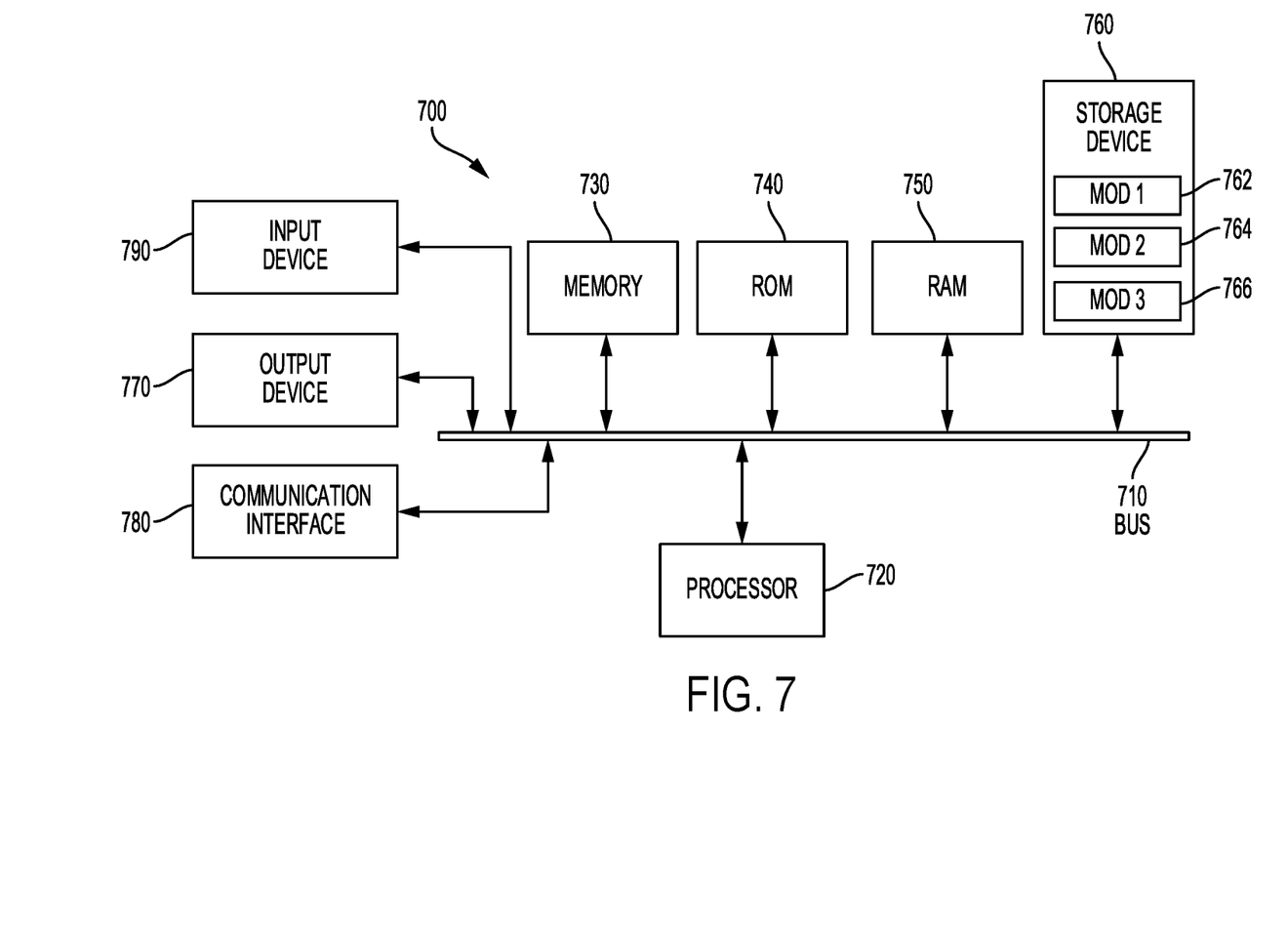
FIG. 7 illustrates an example computer embodiment.

FIG. 7 illustrates an exemplary computing system which can be used to perform the concepts and principles disclosed herein. This exemplary system 700 can include a processing unit (CPU or processor) 720 and a system bus 710 that couples various system components including the system memory 730 such as read only memory (ROM) 740 and random access memory (RAM) 750 to the processor 720. The system 700 can include a cache of high speed memory connected directly with, in close proximity to, or integrated as part of the processor 720. The system 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, display 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 760, other types of computer-readable media which can store data that are accessible by a computer, such as magnetic cassettes, flash memory cards, digital versatile disks, cartridges, random access memories (RAMs) 750, and read only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. An augmented reality device comprising:
   at least one transparent display having an inner surface and an outer surface, wherein the inner surface is configured to display graphics to a user;
   a processor;
   a computer-readable storage medium having instructions stored which, when executed by the processor, cause the processor to perform operations comprising:
   receiving, from a server, physical package dimensions associated with a physical package;
   receiving, from the server, a storage location where the physical package should be placed within a storage area;
   identifying a current location of the augmented reality device;
   identifying a current view of the user of the augmented reality device;
   generating augmented view data based on the current location and the current view, wherein the augmented view data defines dimensions of a virtual package in the storage location, the virtual package illustrating how the physical package should be placed within the storage location based on the physical package dimensions and based on package placement rules;
   displaying, using the augmented view data and on the inner surface of the at least one transparent display, an augmented view of the storage area such that the user, while storing the physical package, can see the storage area with the virtual package displayed graphically in the storage location;
   searching the storage area for a previously stored physical package; and
   highlighting, in the augmented view and on the inner surface of the at least one transparent display, the previously stored physical package based on identifying the previously stored physical package in the storage area,
   wherein the physical package was unknown to the augmented reality device when another package was previously placed in the storage area, wherein the augmented reality device generates a confirmation when the physical package is placed in the storage location, and wherein the augmented view of the storage area is updated based on the confirmation.

2. The augmented reality device of claim 1, wherein the storage area is a freight truck.

3. The augmented reality device of claim 1, wherein the storage area is a grocery bag.

4. The augmented reality device of claim 1, wherein the augmented reality device is wearable by the user, the augmented reality device being shaped as one of glasses and a visor.

5. The augmented reality device of claim 4, wherein the user is assigned to load a plurality of storage areas.

6. The augmented reality device of claim 1, the computer-readable storage medium having additional instructions stored which, when executed by the processor, cause the processor to perform operations comprising:

transmitting, to the server, a confirmation that the physical package is placed in the storage location.

\* \* \* \* \*